May 8, 1951 J. W. COOK 2,551,825
MECHANICAL CONTROL MECHANISM
Filed Sept. 28, 1948 4 Sheets-Sheet 1
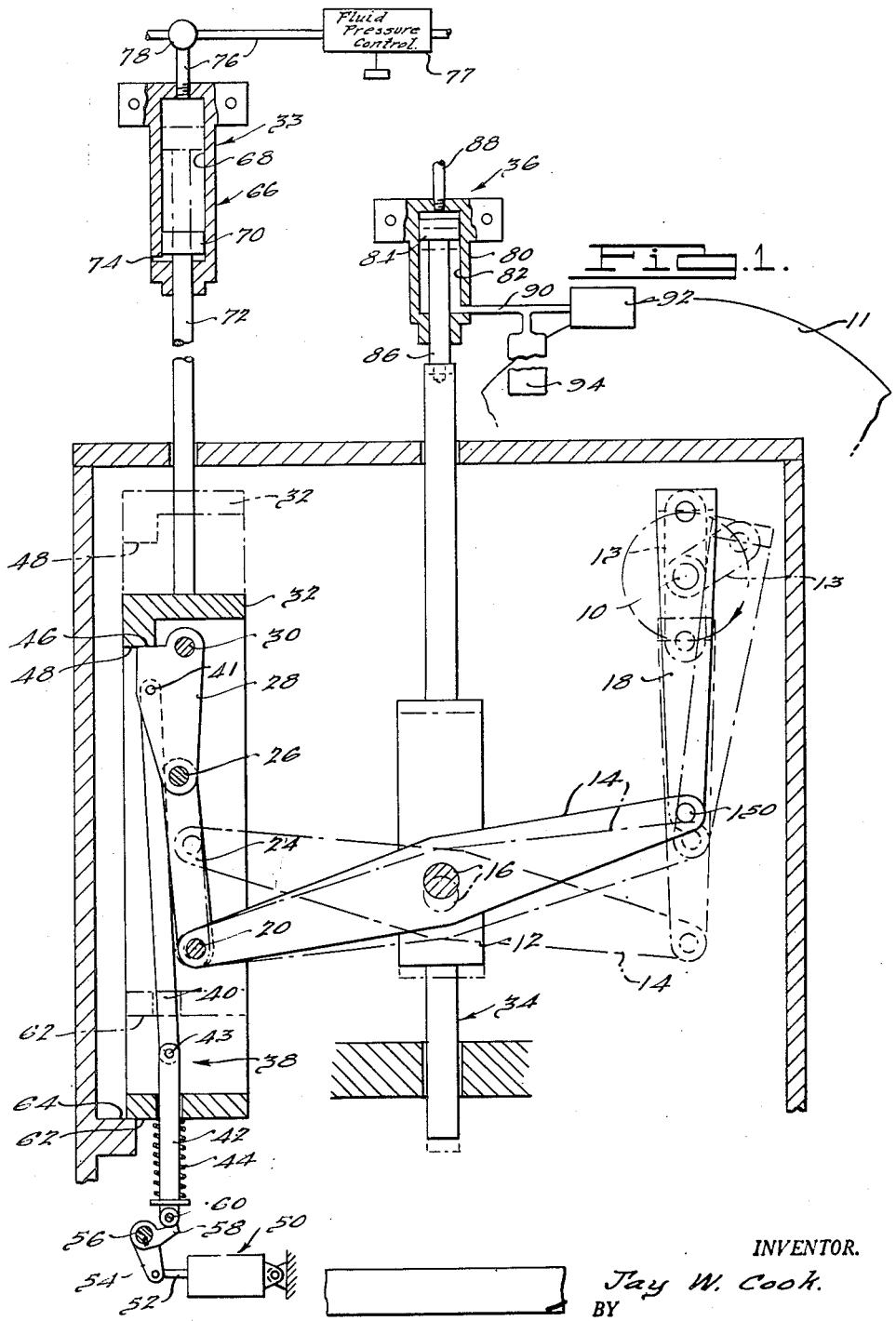
INVENTOR.
Jay W. Cook.
BY
Harness, Dickey & Pierce.
ATTORNEYS.

May 8, 1951          J. W. COOK          2,551,825
MECHANICAL CONTROL MECHANISM
Filed Sept. 28, 1948          4 Sheets-Sheet 2
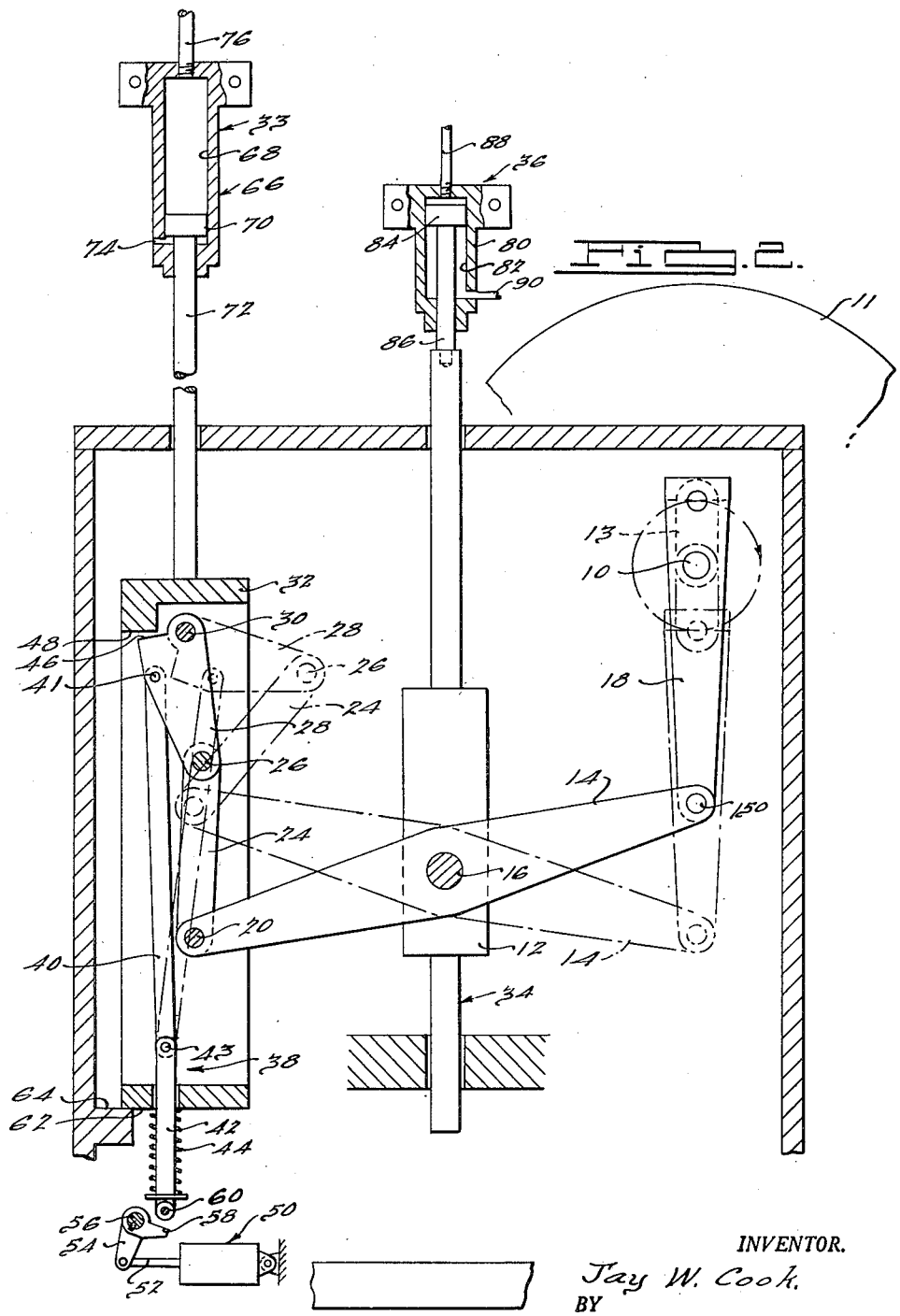
INVENTOR.
Jay W. Cook.
BY
Harness, Dickey & Pierce
ATTORNEYS.

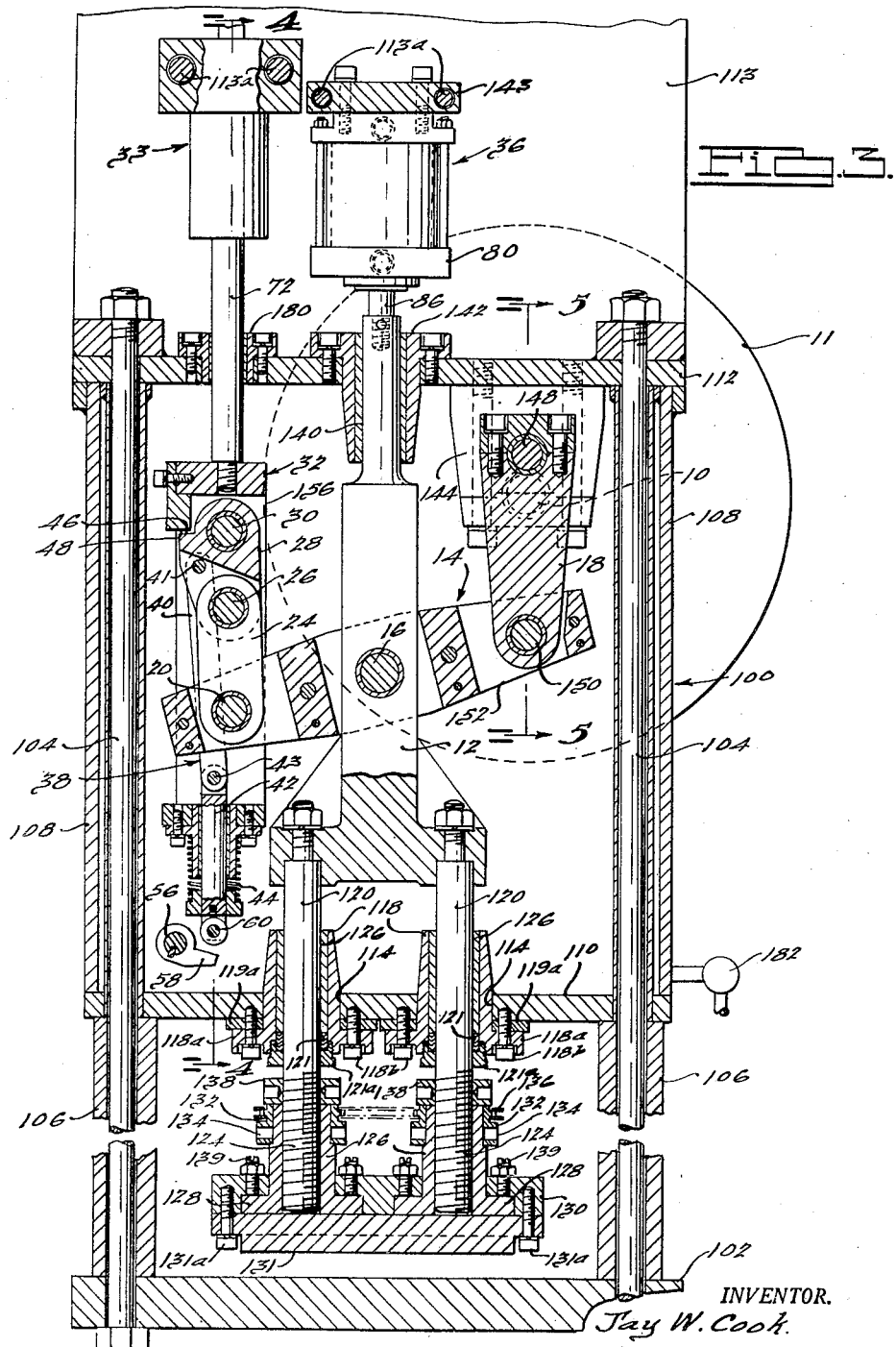

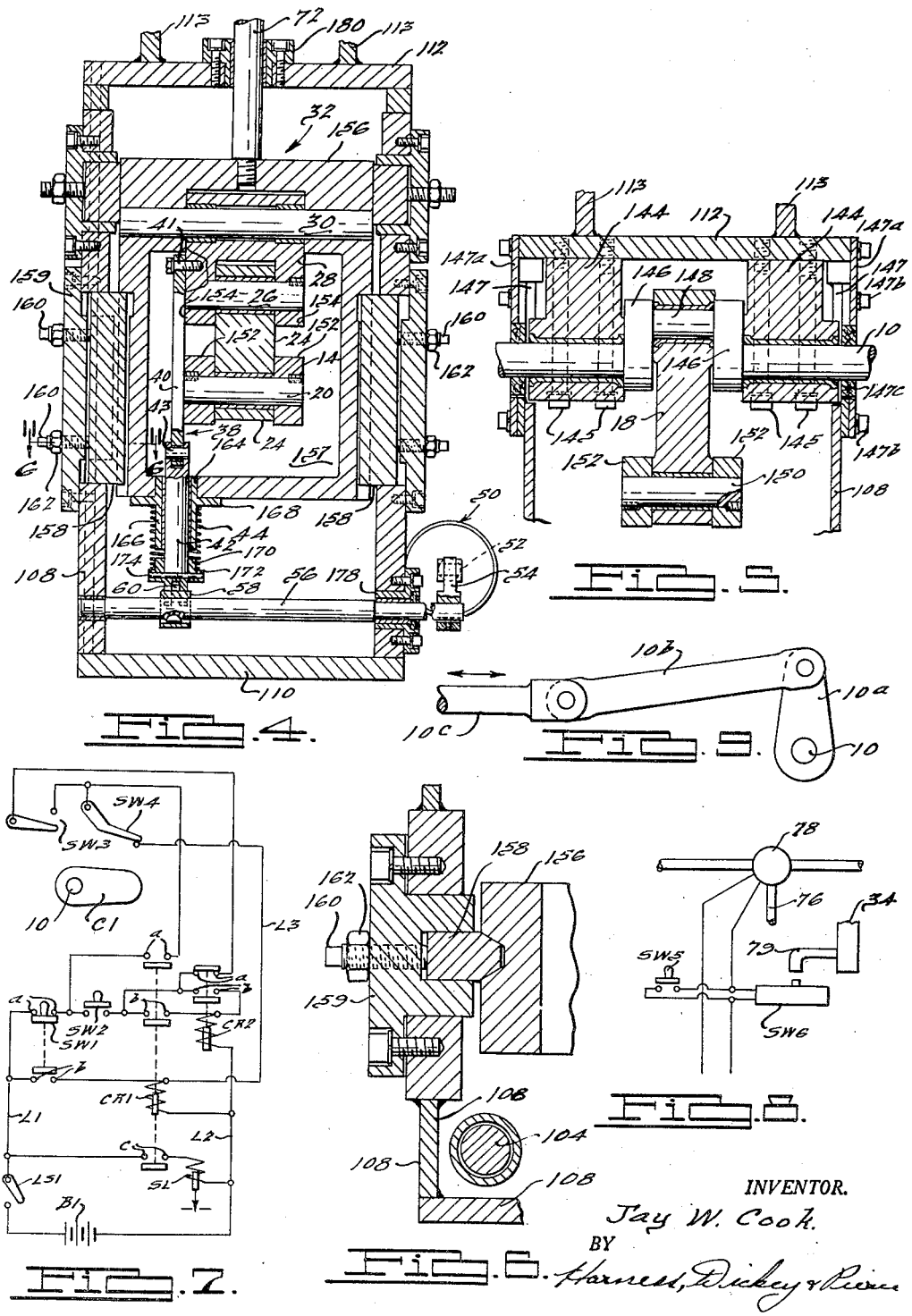

Patented May 8, 1951

2,551,825

UNITED STATES PATENT OFFICE 2,551,825

MECHANICAL CONTROL MECHANISM

Jay W. Cook, Detroit, Mich.

Application September 28, 1948, Serial No. 51,585

24 Claims. (Cl. 74—40)

The present invention relates to methods of and mechanism for effecting couplings between driving and driven members and in the herein illustrated preferred form provides an improved method of a mechanism for effecting a coupling between a power source and a reciprocal work member.

The principal objects of the present invention are to provide arrangements and methods of the above generally indicated type which are effective to operatively couple a driven work member to a driving member; to provide such a mechanism in which the control for effecting the coupling connection may be applied at any time but the coupling of the work member to the driven member will be effected only at one particular rotative position of the driving member; to provide such a coupling which is positive and eliminates the need for clutches and sliding keys; to provide in such a mechanism means for determining the maximum force which can be imparted to the work member; to provide relief means which will permit the driving member to go through its entire cycle even though the working member may be prevented from going through its cyclic movement; to provide a mechanism in which its work stroke may be varied; to provide a mechanism having a normal stroke which is independent of the actual tool stroke; to provide a ram for drawing metals which will operate to provide a constant draw pressure irrespective of the speed of operation of the prime mover; to provide a mechanism for use with presses or the like in which the speed of operation of the prime mover may be maintained constant irrespective of the type of press operation being performed; to provide a ram member actuated by a constantly moving prime mover which may be arrested in any portion of its working stroke; and to provide a press mechanism operated by a crank arm, eccentric or toggle movable throughout 360 degrees, or movable through approximately 180 degrees depending on type of primary movement, during which the press operation may be carried on during any portion of the initial 180 degrees of the movement of the crank arm.

Other objects of this invention will be apparent from the specification, appended claims and the drawings in which drawings like characters are designated by the same reference characters.

Figure 1 is a diagrammatic view of a mechanism embodying the invention and showing the relationship of the parts when the working member is being driven by the driving member;

Fig. 2 is a similar diagrammatic view showing the relationship of the parts when the driving member has been rendered ineffective to drive the work member;

Fig. 3 is a sectional view of a mechanism embodying the invention;

Fig. 4 is a view taken substantially along the line 4—4 of Fig. 3;

Fig. 5 is a view taken substantially along the line 5—5 of Fig. 3;

Fig. 6 is a view taken substantially along the line 6—6 of Fig. 4;

Fig. 7 is a schematic view of a control system for controlling one of the fluid actuators;

Fig. 8 is a schematic view of another control system for controlling another of the fluid actuators; and Fig. 9 is a view showing a form of the invention in which the drive shaft is oscillated rather than rotated.

Generically the invention contemplates the actuation of a reciprocally movable force exerting member or ram, such as the movable member of a press adapted upon reciprocation to exert a pressure or to perform a press operation such as blanking, piercing, shearing, drawing or other forming operations, from a continuously rotating or rocking shaft provided with a crank arm for translating the rotating movement into a reciprocal movement through the medium of a rocking beam which under idling condition rocks about the press slide or ram as a fulcrum and under operating conditions rocks about a second pivot point or fulcrum for movement of the ram during a working stroke. The invention further contemplates such a mechanism in which the stroke of, and force exerted by, the ram may be regulated by regulating the force exerted thereon by a yoke. The invention still further contemplates the provision of means for controlling the movement of a force controlling yoke whereby the press operation may be performed during a desired portion of the movement of a constantly rotating or rocking crank arm.

Referring to the drawings and to Figs. 1 and 2 in particular, the numeral 10 designates a continuously rotating or rocking shaft which may be provided, if desired, with an energy storing mechanism such as the flywheel 11 driven by a motor (not shown); such a drive allowing for a full rotative movement. As shown in Fig. 9, the shaft 10 may have secured thereto an arm 10a which in turn may be connected through a connecting rod 10b to a primary reciprocating member 10c to give a rocking movement to the shaft 10. The shaft 10 (Fig. 1) carries a crank arm 13 which is arranged for rotary movement with the shaft 10. If the rocking movement is imparted to the shaft 10 as disclosed in Fig. 9, it will be evident from the following disclosure that the oscillation applied to the oscillatory or rockable beam 14 will be substantially the same as with the rotating shaft especially if the shaft 10 is oscillated through an angle of 180 degrees. It is therefore believed that a complete description of the mechanism when operated by the rotating shaft 10 will be sufficient and no detailed description will be given with respect to the operation in which the shaft 10 is oscillated by arm 10a.

The oscillating or rockable beam 14 is pivotally secured to the rim 12 by means of the pin 16 at a mid-point thereof and is operatively connected to the crank arm 13 by means of a link 18 adjacent one end portion thereof. The other end portion of the beam 14 carries a pivot pin 20 which pivotally secures this end of the beam 14 to the lower end of a link 24. The opposite end of the link 24 is connected by pin 26 to a lever or locking link 28. The link 28 is in turn pivotally carried on a pin 30 carried by a yoke 32 normally held in a fixed position by means of a constant force exerting means such as is diagrammatically shown as a fluid mechanism 33 or in some instances could be a spring.

The press slide or ram 12 carries at its lower end portion an adapter mechanism generally designated 34 and which is arranged to carry this movable portion of a press tool, the stationary portion of which is carried by a fixedly mounted bolster in the usual manner of press mechanism. The ram 12 is normally biased to its uppermost position as by means of a fluid mechanism 36 or in some instances by a spring.

The locking link 28 is normally urged by a linkage 38 into a rotated position in which the pin 26 is positioned substantially midway of the two positions shown in Fig. 2 and is maintained to the right of the line of centers of the pins 20 and 30 during the entire oscillating movement of the locking link 28. The locking link 28 will rotate in a counterclockwise direction upon upward force being transmitted thereto by the link 24 to permit the beam 14 to rock about the pin 16. The force exerted by the mechanism 36 in holding the ram 12 in its upper position is substantially greater than any force opposing rotation of the locking link 28 so that the beam 14 will rock about the pin 16 as a fixed fulcrum while the ends of the beam will be permitted to reciprocate in an arcuate path due to the relatively free reciprocable conditions of the locking link 28 on its pivot pin 30.

The linkage 38 comprises a first link 40 which is pivotally secured to the locking link 28 as by means of the pin 41 and a second link 42 which is guided for vertical reciprocal movement in the yoke 32 and which is pivotally connected to the link 40 by means of the pin 43. A helical coil spring 44 surrounds the link 42 and exerts a downward force on the link 42 which tends to urge the locking link 28 to a position intermediate that shown between the full line position and the dot-dash line position of the locking link 28 as shown in Fig. 2 in which the pins 30, 41 and 43 are in alignment. With this relation of the pins, the spring 44 acting through the linkage 38 will tend to oppose movement of the locking link 28 with an increasing force at each limit of the movement of the locking link 28 as determined by the left-hand end portion of the beam 14, to at least partially oppose the inertia of the moving parts as they are brought to rest at either end points of their oscillating movement. The extreme clockwise position of oscillating movement of the locking link 28 during the idling cycle of the mechanism is preferably so chosen that the pin 26 almost reaches but does not pass beyond the line of centers between the pins 20 and 30. Preferably the pin will remain a slight distance to the right of this line of centers between the pins 20 and 30 so that there is no tendency for the links 24 and 28 to assume a dead center position whereby false movement of the ram 12 will occur. The positioning of the pin 26 with respect to the line of centers between the pins 20 and 30 however should be sufficiently close to this line of centers so that upon actuation of the linkage 38 in an upward direction, with the left end of the beam 14 at the lower limit of its travel, the locking link 28 is rotated in a clockwise direction to bring the pin 26 to the left of the line of centers between the pins 20 and 30 whereby the left-hand end of the beam 14 will be locked through the link 24 to the locking link 28 to prevent upward movement thereof.

The locking link 28 is provided with an upwardly facing shoulder 46 which is engageable with a downwardly facing shoulder 48 of the yoke 32 whereby continued rotation of the shaft 10 and arm 13 will act through the link 18 to rotate the beam 14 about the pin 20 as a center and thereby cause the ram 12 to be moved downwardly in a working stroke to exert a downward force on the movable press tool for causing the tool to perform a press operation upon a workpiece placed between the two press tool portions. As the shaft continues to rotate throughout a complete revolution, the right-hand end of the beam 14 will be moved downward in an arcuate path and return upwardly through this same path to its initial position causing the ram 12 to pass through its complete normal stroke. As shown, the pin 16 is substantially midway of the beam 14 whereby the force imparted to the ram 12 is twice that applied by the arm 13 but the distance traveled or stroke will be one-half of the travel or stroke imparted by the arm 13. It is to be distinctly understood, however, that the pin 16 could be at other points along the beam 14 for imparting differing ratios of force and stroke.

This upper locking movement of the linkage 38 is imparted by a selectively operable fluid mechanism 50 having an operating ram 52 operatively connected to a lever 54 carried by shaft 56 which shaft 56 is provided with a second lever 58 operable to engage a roller 60 carried by the lower end portion of the link 42. Generically the fluid actuator 50 may of course be energized during any portion of the idling cycle of the mechanism in which the locking link 28 will be in any of its rotative positions shown in Fig. 2. In such case the force exerted by the actuator 50 on the linkage 38 would be, however, small in comparison to the force exerted upon the locking link 28 by the beam 14 when it is rocking about the pin 16 so that until the locking link 28 approaches the clockwise limit of its idling movement such force exerted by the actuator 50 to the linkage 38 will merely act in opposition to the spring 44 and will be effective to cause locking only when the locking link 28 substantially reaches the lower end of its oscillation at which time the locking link 28 is rotated clockwise to engage the shoulders 46 and 48 in turn moving the pin 26 to the left of the line of centers between the pins 20 and 30. Subsequent rotation of the shaft 10 and arm 13 will cause the ram 12 to move through a working stroke substantially as described.

It is preferred, however, to provide a control system substantially as shown in Fig. 7. The conductors L1 and L2 are connected to opposite terminals of a source of electrical energy of suitable voltage and which may be either alternating or direct current and which is diagrammatically shown as the battery B1. The line switch LS1 serves to disconnect the circuit when desired. A repeat-non-repeat switch SW1 is provided and which is shown in its nonrepeat position; that is, even though the start switch SW2 remains closed the press will perform one cycle only. Closure of the initiation switch SW2 prepares a circuit so that upon closure of the cam operated switch SW3 the control relay CR1 will be energized for energizing the solenoid SL. This actuation of the relay CR1 also closes a holding circuit through its contacts a whereby the relay CR1 will be maintained energized until the cam C1 opens the switch SW4. Energization of the relay CR2 by relay CR1 closes its contacts b for completing a holding circuit which will maintain the relay CR2 energized and its contacts a open so long as the switch SW2 is held closed, whereby the switch SW3 is ineffective to again energize the relay CR1 even though it is subsequently actuated by the cam C1. In this manner the ram 12 cannot again be actuated until the switch SW2 has been opened to reset the control circuit for a subsequent operation.

Referring more specifically to the circuit and considering the switch SW1 to be in its nonrepeat position, closure of the switch SW2 prepares a circuit from the line L1 through the closed contacts a of the switch SW1, through the now closed contacts of the switch SW2, through the normally closed contacts a of the relay CR2 to the normally open switch SW3 associated with the cam C1 driven by the shaft 10. As soon as the cam C1 closes the switch SW3, it completes the circuit from this switch through the normally closed switch SW4 and conductor L3 to one terminal of the energizing winding of the control relay CR1 and therethrough to the line L2 causing the relay CR1 to be actuated closing its contacts a and b. Closure of the contacts a of the relay CR1, completes a holding circuit around the switch SW2 through the normally closed switch SW4 and the line L3 to the energizing winding of the relay CR1 so that the relay CR1 will be maintained energized until such time as it is de-energized due to the opening of the switch SW4 by the cam C1. Energization of the relay CR1 also closes its contacts c whereby the actuating coil of the solenoid SL will be energized for admitting fluid to the actuator 50 above referred to. Closure of the contacts b of the relay CR1 completes a circuit from the line L1 through the closed contacts a of the switch SW1 and the closed contacts of the switch SW2, the now closed contacts b of the relay CR1 and the energizing winding of the relay CR2 to the line L2 whereby the contacts a of the relay CR2 are opened and the contacts b thereof are closed.

Opening of the contacts a of the relay CR2 acts to prevent a subsequent closure of the switch SW3 from again energizing the relay CR1, it being remembered that prior to a subsequent closure of the switch SW3 the switch SW4 will have been actuated to de-energize the relay CR1. Closure of the contacts b of the relay CR2 completes a holding circuit about the contacts b of the relay CR1 whereby the relay CR2 will be held in an energized position even though the relay CR1 is de-energized by the switch SW4 and will be held energized until the switch SW2 is subsequently opened to reset the circuit for a subsequent operation.

When it is desired to operate the mechanism for repeat operations, the switch SW1 is moved from its shown position to open the contacts a thereof and close the contacts b thereof. Under this operating condition the control relay CR1 is maintained continuously energized through an obvious circuit holding its contacts c in closed position and maintaining the solenoid SL continuously energized. It is believed that it will be apparent that the mechanism will continue to operate the ram 12 until either the switch SW1 is moved to nonrepeat position or the line switch LS1 is opened to de-energize the control relay CR1 and solenoid SL.

As indicated above, fluid actuator 33 is provided for maintaining the yoke 32 in a normally stationary position in which a shoulder 62 thereof is in engagement with a shoulder 64 carried by a portion rigid with the head of the mechanism. The fluid mechanism 33 comprises generally a casing 66 having a piston chamber 68 in which is reciprocally movable a piston member 70. The piston member 70 carries a piston rod 72 extending downwardly and outwardly from the casing 66 and operatively connected to the yoke 32. The lower end of the chamber 68 beneath the piston 70 may be vented to atmosphere as by means of the port 74 while the upper end of the piston chamber 68 above the piston 70 may be connected to a fluid pressure source as by means of the conduit 76. The magnitude of the pressure may be adjusted by means of a control 77 whereby any desired fluid pressure, constant or variable according to a preset pattern may be supplied to the conduit 76. It will now be apparent that the fluid pressure appearing above the piston member 70 will cause the yoke 32 to be held in its shown position with the shoulder 62 in engagement with the shoulder 64 under a force, which force will be determined by the control 77 independently of any relative position of the piston 70 in the chamber 68.

Under certain operating conditions of the press the downward force exerted by the piston member 70 on the yoke 32 is so chosen that it exceeds the normal reactive force applied to the yoke 32 during a stroke of the ram 12 only by a sufficient margin of safety so that the yoke 32 will be held immovable during normal press operation. In the event of some abnormal operation of the press in which a greater reactive force is exerted upon the yoke 32, the yoke 32 will be permitted to move upwardly thereby arresting further downward movement of the ram 12 and preventing possible damage to the press tools associated with the ram.

If desired, the conduit 76 may be provided with a three-way emergency valve 78 which upon actuation will serve to shut off the flow of fluid in the conduit 76 from the constant pressure source and vent the interior of the chamber 68 above the piston member 70 to atmosphere, or if desired to a subatmospheric pressure, whereby the yoke 32 will be moved upwardly arresting the downward movement of the ram 12 irrespective of any upward pressure placed on the ram 12 from the movable press tool or otherwise and irrespective of the position of the ram 12 and arm 13. Such actuation of the valve 78 may be had by closure of the switch SW5 (Fig. 8) or by any other suitable circuit.

Under other operating conditions as for example in a metal drawing operation, the fluid pressure in conduit 76 may be adjusted to provide a force on the ram 12 just sufficient to cause proper drawing of the metal. Under this last condition the force exerted by the ram 12 to draw the metal will remain substantially constant irrespective of the speed of rotation of the crank arm 13 since any tendency of the force applied by the arm 13 to increase the downward force on the ram 12 will result in an upward movement of the yoke 32. This constant applied force by the ram 12 will be effected irrespective of any movement of the ram 12.

It will be evident that the speed at which the ram 12 may be moved downwardly by the arm 13 will vary from 0 to maximum to 0 as the arm 13 moves through 180 rotative degrees from top dead center to bottom dead center. This invention contemplates the use of any portion of the above described movement of the arm 13 from 0 to 180 degrees for applying the working force to the ram 12. For example, suppose it is desired to strike a fast hammer blow for embossing, the movable press tool is adjusted so that it engages the work substantially at the ninety degree position of the arm 13 so that the ram 12 will be traveling at maximum speed. Other press operations will require the ram 12 to engage the work at other speeds and consequently will require the movable press tool to engage the work at other angular positions at the arm 13.

Under some operating conditions such as embossing, a fast sharp engagement of the press tool with the work is required but after a predetermined deformation of the work the stroke should immediately be stopped. This may be accomplished under the purview of this invention by providing an electrical circuit for controlling the three-way valve 78. In this instance, a microswitch SW6 provided on the bolster is engageable by a lug 79 movable with the movable tool. The lug 79 is set to actuate the switch SW6 when the metal has been embossed the desired amount. Actuation of the switch SW6 energizes the valve 78 for releasing the pressure above the piston 70 whereby downward movement of the ram 12 is immediately terminated. Such termination of movement does not involve the application of a large braking force to overcome the relatively large inertia of the flywheel 11.

The upward force hereinbefore referred to as applied to the ram 12 by the mechanism 36, for certain types of operations, may be of such magnitude that the upward force exerted thereby is just in excess of the weight of the ram 12 and parts carried thereby so that when the pressure in the upper portion of the chamber 68 is vented by means of the valve 78 as just set forth, the ram 12 will slowly but surely move to its upward position. This is a particularly desirable safety feature for the mechanism since the valve 78 permits stopping of the downward movement of the ram 12 at any position in the working cycle thereof and the mechanism 36 provides for a smooth return of the ram 12 after a downward working movement. Under other conditions of operation in which a considerable force is required to withdraw the tool, the ram 12 will stop its downward movement but will not be moved upwardly until the crank arm 13 positively moves it upwardly.

The mechanism 36 (Fig. 1) comprises a housing 80 having a piston chamber 82 which receives for reciprocation therein a piston member 84 having a piston rod 86 operatively connected to the ram 12. The upper chamber portion of the chamber 82 above the piston 84 may be vented to atmosphere as by means of the conduit 88 while the lower portion of the chamber 82 below the piston member 83 is operatively connected to a constant source of fluid pressure by means of the conduit 90.

The conduit 90 is provided with a pressure regulating valve 92 for regulating the pressure supplied to the conduit 90 from a higher pressure source (not shown). The conduit 90 is also provided with an expansion tank 94 to receive fluid from the chamber 82 during downward movement of the piston 84 to control the pressure within the chamber 82 below the piston 84.

The regulating valve 92 (Fig. 1) may be adjusted for providing a great variety of pressures within the lower portion of the chamber 82. One such pressure is that described above for the return of the ram 12. Other and usually greater pressures but lesser pressures may sometimes be desirable, are provided to cushion the downward movement of the ram 12 and for a quick return in the event of hammer blow operation of the press as might be required in embossing to prevent shearing forces on pin 16. The varying of the pressure in the mechanisms 36 and 33 may be adjusted independently for some press operations for cushioning during drawing and other operations.

The length of the beam 14 is preferably so chosen that the arcuate path of movement of the pin 150 connecting the link 18 with the beam 14 is substantially disposed on one side of a vertical plane extending perpendicularly through the axis of rotation of the shaft 10. The pin 20 in the other end of the beam 14 is preferably so positioned that the ends of its arcuate path of movement terminate just slightly to the right side of the longitudinal center line of a vertical plane extending through the longitudinal center line of the pin 30.

As will be described more in detail hereinafter in connection with Figs. 3, 4, 5 and 6, the ram 12 is guided for straight line vertical movement and substantially small side forces will be exerted thereon due to the forces exerted on the opposite end portions of the beam 14. It will be noted that with the arm 13 in upper dead center position the link 18 will exert a substantially vertical force on the right-hand end of the beam 14 but as the arm 13 continues to rotate, it will exert a force having a small component in the left-hand direction on the beam 14. The major portion of the force exerted by the arm 13 will, however, act in a downward direction. This component of left-hand force exerted by the link 18 will be opposed to a great extent by the right-hand component of force exerted by the link 24 since during the work stroke the pin 26 will be somewhat to the left-hand side of a vertical plane extending through the longitudinal center line of the pin 30. Since the angle of the link 24 with respect to the vertical changes slightly during a working cycle, this link 24 will cause a slightly varying rightward horizontal thrust on the beam 14 which will tend to oppose the left-hand thrust exerted on the beam 14. It will now be evident that almost purely vertical movement is imparted by the beam 14 to the ram 12 whereby the bearing holding the ram 12 against sideward movement need not be large and consequently small loss of power is involved in overcoming such side force.

Referring to a structural embodiment of the invention as shown in Figs. 3, 4, 5, and 6, a press crown 100 is supported on a bolster plate 102 by means of through bolts 104 and is held in spaced relation to the bolster plate 102 by means of spacing sleeves 106 concentrically arranged on the through bolts 104. The crown 100 comprises a member 108 which may be rectangular in cross section as shown in Fig. 6 or any desired section, closed at its lower end by a bottom wall 110 and closed at its upper end by a removable top wall 112 to provide an enclosure or housing for the mechanisms. The top wall 112 is provided with spaced upwardly extending platelike supports 113 to which the mechanisms 33 and 36 may be secured as by bolts 113a. The lower wall 110 is provided with a pair of spaced apertures 114 extending therethrough in which are positioned sleeve bearing members 118, which receive and guide a pair of thrust rods 120 which correspond to the diagrammatically shown adapter 34. The bearing members 118 have flanges 118a through which cap screws 118b extend to bolt the member 118 to the wall 110. In order to insure an oil-tight seal between the wall 110 and members 118, gaskets 119a are provided therebetween in a usual manner.

The bearings 118 are further provided at their lower ends with a fluid seal 121 serving to prevent flow of fluid through the bearing members 118 along the shafts 120; the seals 121 being held in place by nuts 121a.

The lower outwardly extending portions of the rods 120 are of slightly reduced diameter relative to their main body portions and externally screw threaded as at 124 for screw threaded reception of internally screw threaded sleeves 126 provided with radially extending flanges 128 at their lower end portions. The flanges 128 are received within downwardly opening recesses provided in an adapter plate 130 and are adapted to abut the upper surface of the punch holder 131 held to the plate 130 as by cap screws 131a. Each of the sleeves 126 is provided with a sprocket wheel 132 which is suitably held against rotation with respect to its associated sleeves 126 and is rotatably adjusted by suitable means such as a spanner wrench co-operable with radial aperture 134. A sprocket chain 136 connects the two sprocket wheels 132 for simultaneous rotation whereby the sleeves 126 may be simultaneously adjusted in position along the rod 120. After the sleeves 126 are correctly positioned on the shaft 120 they may be locked by means of locking nuts 138 also rotatably adjusted by suitable means such as a spanner wrench.

In order to insure a tight connection between the plate 130 and tool 131 with the sleeve 126, the plate 130 is provided with a number of screw threaded apertures which receive set screws 139 engageable at their lower end portions with the upper face of the flanges 128 to wedge the flanges into engagement with the upper face of the tool 131. The usual locking nuts may be provided for holding the screws 139 in adjusted position.

The upper end portions of shafts 120 are secured to the ram 12 for joint movement and the sleeves 126 and 142 serve to guide the ram 12 in its vertical movement. The ram 12 has an upwardly extending reduced diameter portion 140 which is received within a sleeve bearing member 142 carried by the top cover plate 112 of the crown 100. Externally of the cover plate 112 the ram 12 is provided with a threaded aperture for screw threadedly receiving the piston rod 86 of the fluid mechanism 36. The top wall support 113 welded or bolted to the top plate 112 supports the fluid mechanisms 33 and 36 and strengthens the plate 112 to carry total pressures.

The shaft 10, as is more clearly shown in Fig. 5, extends through the member 108 and is journaled within spaced bearing 144 carried by the cover plate 112 by the cap screws 145. The member 108 has U-shaped wall apertures 147 opening upwardly through the upper end surface thereof and through which the shaft 10 extends. The apertures 147 are closed externally by cover plates 147a held to the member 108 as by cap screws 147b. The shaft 10 extends through apertures in the plate 147a and which are sealed against oil flow therethrough by seal 147c. The beforementioned crank arm 13 is located intermediate the bearings 144, and comprises a pair of spaced crank arms 146 carried by the shaft 10 and which carry a crankpin 148. The connecting rod or link 18 is journaled on the crankpin 148 intermediate the crank arms 146 and journaled at its lower end on a pin 150 which extends between spaced side members 152 which form the beam 14. The ram 12 (Fig. 3) passes upwardly between the side members 152 of the beam 14 and the pin 16 is journaled in the ram 12 and is press fitted at either end in the side members 152. The link 24 is journaled at its lower end on the pin 20 which is carried by and press fitted between the side members 152 of the beam 14. The locking link 28 comprises a fairly thick member provided with spaced bearing sleeves journaled on pin 30 and is provided with a pair of spaced downwardly extending legs 154 carrying opposite ends of the pin 26.

The yoke 32 (Fig. 4) comprises a substantially rectangular member 156 having a relatively large rectangular opening 157 extending completely therethrough and through which one end portion of the beam 14 extends and in which the links 24 and 28 as well as certain other members are located. The yoke 156 is movably carried within the crown 100 on adjustable ways 158 (Fig. 6) carried by rectangular blocks 159 suitably secured as by bolting to the opposite side walls of the member 108. The ways 158 are adjustable inwardly and outwardly of the member 108 by screws 160 threadedly carried by block 159 and which may be locked in adjusted position as by means of the locking nuts 162. The ways 158 provide guides for supporting yoke 32 for the reciprocal movement described above.

The bottom wall of the member 156 is provided with an aperture 164 which receives a sleeve bearing member 166 having a flange 168 engageable with the undersurface of the member 156, the link 42 extending through and guided for reciprocal movement in the member 166. Externally of the lower end of the member 166 the link is provided with a collar 170 having a flange 172 against which one end of the spring 44 engages. The other end of the spring 44 extends externally of the outer periphery of the sleeve bearing member 166 and engages its flange 168. The collar 170 is held against movement relative to the link 44 as by means of the pin 174. The before-mentioned shaft 56 is journaled at one end within an enclosed sleeve bearing in the member 108 and the other end extends through the member 108 externally thereof and is journaled within a bearing member 178. Externally of the member 108 the shaft 56 is provided with the arm 54 which in turn is connected to the exteriorly arranged mechanism 50. Interiorly of the member 108 of the crown 100, the shaft 56 is provided with the arm 58 which engages the roller 60 carried by the lower end portion of the link 44. The mechanism 33 (Fig. 3) is suitably carried in fixed position in the supports 113 of the crown 100 and the rod 72 thereof extends through a sleeve bearing 180 provided in the top wall 112 of the crown 100. The lower end portion of the rod 72 is screw threadedly connected to the upper edge portion of the rectangular member 156. The crown 100 during operation of the mechanism is preferably partially filled with lubricating oil whereby the moving parts are completely lubricated. The crown 100 not only holds the oil but keeps foreign matter out.

With the particular embodiment of the invention as shown in Figs. 3, 4, 5 and 6, it will be observed that by draining the oil from the member 100, through drain 182, removing the nuts at the upper end of the through bolts 104, removing the cap screws 147b and removing the sleeves 126 and lock nuts 138, the entire operating mechanism may bodily be removed upwardly through the top end of the member 108 for convenient repair, inspection or replacement.

The individual power mechanism just described may be combined in multiple units either with separate housings or more than one such unit may be contained in a single housing. The crank angles may be identical in which case two or more units may be arranged to carry a single tool 131 and exert thereon a pressure equal to the sum of the pressures exerted by an individual unit or they can be arranged to carry separate dies for performing a series of operations simultaneously on a series of parts. By arranging the crank arms at different rotative angles the working forces carried by the common driver may be staggered. The separate units may be geared to a common shaft or may be directly connected to such a common shaft. Other arrangements beyond those suggested can be utilized as the occasion demands and their arrangement will become apparent from the above description.

What is claimed is:

1. In a mechanism for providing an operative coupling between a driving member having a continuous cyclic movement and a driven member, an intermediate member continuously connected to said driving member and arranged to have a cyclic movement about either of two centers, means for connecting said driven member to said intermediate member and for enabling said driven member to normally fix one of said centers and cause said intermediate member to move about said one center, and selectively operable means normally effective to permit movement of said other center and actuatable to complete said coupling to restrain movement of said other center thereby causing the said movement of said driving member to cause a cyclic movement of said one center and of said driven member.

2. In a mechanism for providing an operative coupling between a driving member having a continuous cyclic movement and a driven member, an intermediate member continuously connected to said driving member and arranged to have a cyclic movement about either of two centers, means for connecting said driven member to said intermediate member and for enabling said driven member to normally fix one of said centers and cause said intermediate member to move about said one center, and selectively operable means normally effective to permit movement of said other center and actuatable to complete said coupling to restrain movement of said other center thereby causing the said movement of said driving member to cause a cyclic movement of said one center and of said driven member, said last-mentioned means being operable in accordance with the position of one of said members.

3. In a mechanism for providing an operative coupling between a driving member having a continuous cyclic movement and a driven member, an intermediate member continuously connected to said driving member and arranged to have a cyclic movement about either of two centers, means for connecting said driven member to said intermediate member and for enabling said driven member to normally fix one of said centers and cause said intermediate member to move about said one center, relatively operable means normally effective to permit movement of said other center and actuatable to complete said coupling to restrain movement of said other center thereby causing the said movement of said driving member to cause a cyclic movement of said one center and of said driven member, and means effective solely during one portion of said cyclic movement of said one member for applying said restraint.

4. In a mechanism for forming an operative coupling between a continuously rotating shaft and a reciprocable driven member, the combination of an intermediate member operatively connected to said shaft and rockable thereby about either of two centers, means for connecting said driven member to said intermediate member and for normally enabling said driven member to fix one of said centers and cause said rocking to occur about said one center, and selectively operable means normally effective to permit movement of said other center and actuatable to complete said coupling to restrain movement of said other center thereby causing said movement of said shaft to cause a reciprocating movement of said one center and of said driven member.

5. In a mechanism for forming an operative coupling between a continuously rotating shaft and a reciprocable driven member, the combination of an intermediate member operatively connected to said shaft and rockable thereby about either of two centers, means for connecting said driven member to said intermediate member and for normally enabling said driven member to fix one of said centers and cause said rocking to occur about said one center, and selectively operable means normally effective to permit movement of said other center and actuatable to complete said coupling to restrain movement of said other center thereby causing said movement of said shaft to cause a reciprocating movement of said one center and of said driven member, said last-mentioned means being operable in accordance with the position of one of said members.

6. In a mechanism for forming an operative coupling between a continuously rotating shaft and a reciprocable driven member, the combination of an intermediate member operatively connected to said shaft and rockable thereby about either of two centers, means for connecting said driven member to said intermediate member and for normally enabling said driven member to fix one of said centers and cause said rocking to occur about said one center, and selectively operable means normally effective to permit movement of said other center and actuatable to complete said coupling to restrain movement of said other center thereby causing said movement of said shaft to cause a reciprocating movement of said one center and of said driven member, said last-mentioned means being operable to release said restraint in response to the occurrence of a predetermined abnormal force restraining movement of said members.

7. In a mechanism for forming an operative coupling between a continuously rotating shaft and a reciprocable driven member, the combination of an intermediate member operatively connected to said shaft and rockable thereby about either of two centers, means for connecting said driven member to said intermediate member and for normally enabling said driven member to fix one of said centers and cause said rocking to occur about said one center, selectively operable means normally effective to permit movement of said other center and actuatable to complete said coupling to restrain movement of said other center thereby causing said movement of said shaft to cause a reciprocating movement of said one center and of said driven member, and means exerting a substantially constant force for holding said restraining means against movement.

8. In a mechanism for forming an operative coupling between a continuously rotating shaft and a reciprocable driven member, the combination of an intermediate member operatively connected to said shaft and rockable thereby about either of two centers, means for connecting said driven member to said intermediate member and for normally enabling said driven member to fix one of said centers and cause said rocking to occur about said one center, and selectively operable means normally effect to permit movement of said other center and actuatable to be rendered effective at one position of said intermediate member for restraining movement of said other center thereby causing said movement of said shaft to cause a reciprocating movement of said one center and of said driven member.

9. In a mechanism for forming an operative coupling between a continuously rotating shaft and a reciprocable driven member, the combination of an intermediate member operatively connected to said shaft and rockable thereby about either of two centers, means for connecting said driven member to said intermediate member and for normally enabling said driven member to fix one of said centers and cause said rocking to occur about said one center, means operable to be rendered effective solely at one position of said intermediate member about said one center for restraining movement of said other center thereby causing continued movement of said shaft to cause a reciprocating movement of said one center and of said driven member, and additional means controlling movement of said other center for arresting the movement of said driven member subsequent to said other center being restrained.

10. In a mechanism for forming an operative coupling between a continuously rotating shaft and a reciprocable driven member, the combination of an intermediate member operatively connected to said shaft and rockable thereby about either of two centers, means for connecting said driven member to said intermediate member and for normally enabling said driven member to fix one of said centers and cause said rocking to occur about said one center, a link member which is moved by the movement of said intermediate member about said one center, and selectively operable means normally effective to permit movement of said other center and actuatable to restrain movement of said link member to thereby fix said other center and cause said movement of said shaft to cause a reciprocating movement of said one center and of said driven member.

11. In a mechanism for forming an operative coupling between a continuously rotating shaft and a reciprocable driven member, the combination of an intermediate member operatively connected to said shaft and rockable thereby about either of two centers, means for connecting said driven member to said intermediate member and for normally enabling said driven member to fix one of said centers and cause said rocking to occur about said one center, a link member which is moved by the movement of said intermediate member about said one center, and means for restraining movement of said link member to thereby fix said other center and cause said movement of said shaft to cause a reciprocating movement of said one center and of said driven member, said last-mentioned means being actuable solely at one position of the movement of said intermediate member.

12. In a mechanism for forming an operative coupling between a continuously rotating shaft and a reciprocable driven member, the combination of an intermediate member operatively connected to said shaft and rockable thereby about either of two centers, means for connecting said driven member to said intermediate member and for normally enabling said driven member to fix one of said centers and cause said rocking to occur about said one center, a normally fixedly positioned supporting member, linkage carried by said supporting member and movable into a locked position to fix said other center and cause said movement of said shaft to cause a reciprocating movement of said one center and of said driven member, and substantially constant force exerting means holding said supporting member in said fixed position.

13. In a mechanism for forming an operative coupling between a continuously rotating shaft and a reciprocable driven member, the combination of an intermediate member operatively connected to said shaft and rockable thereby about either of two centers, means for connecting said driven member to said intermediate member and for normally enabling said driven member to fix one of said centers and cause said rocking to occur about said one center, selectively operable means normally effective to permit movement of said other center and actuatable to complete said coupling to restrain movement of said other center thereby causing said movement of said shaft to cause a reciprocating movement of said one center and of said driven member, and means effective during any portion of the reciprocating movement of said driven member for releasing said restraining force.

14. In a mechanism for forming an operative coupling between a driving member and a driven member, the combination of an intermediate member coupled between said members and having a normally movable but fixable center of movement, said movement of said intermediate member when said center is movable being ineffective to cause movement of said driven member, and coupling means normally permitting movement of said center and actuatable to fix said center, continued movement of said intermediate member after said center is fixed being effective to cause movement of said driven member, said coupling means being releasable upon application thereto of a load in excess of a predetermined maximum.

15. In a mechanism for forming an operative coupling between a driving member and a driven member, the combination of an intermediate member coupled between said members and having a normally movable but fixable center of movement, said movement of said intermediate member when said center is movable being ineffective to cause movement of said driven member, and coupling means normally permitting movement of said center and adjustable to fix said center, continued member of said intermediate movement after said center is fixed being effective to cause movement of said driven member, said coupling means being operable to fix said center solely at a predetermined point in the movement of said intermediate member.

16. In a mechanism of the character described, a ram, a constantly rotatable crank arm, a fulcrum carried by said ram, a rockable beam fulcrumed on said fulcrum, a connecting link connecting one portion of said beam to said arm, a reaction member, controllable movable means normally operable to permit movement of a second portion of said beam and carried by said reaction member, means for restraining movement of said controllable movable means whereby said controllable means fixedly positions said second portion, and force exerting means exerting a predetermined force opposing movement of said reaction member.

17. The combination of claim 16 in which force exerting means is provided for opposing movement of said ram in one direction.

18. In a mechanism of the character described, a reciprocally movable ram, a rotatable crank arm, a yoke, a beam, means fulcruming said beam on said ram, a first link connecting one portion of said beam to said arm, a second link pivotally carried by said yoke and operatively connected to a second portion of said beam, said second link being movable to permit cyclic movement of said beam by said arm about said ram fulcrum, and selectively operable means operable to hold said second link against movement whereby said beam is caused to have cyclic movement about said second link for movement of said ram.

19. The combination of claim 18 in which means is exerting a predetermined force against said yoke to hold said yoke against movement below a predetermined maximum reaction force and to permit movement of said yoke at forces above said maximum force.

20. The combination of claim 19 in which said force exerting means acts to hold said yoke with a substantially constant force irrespective of movement imparted to said yoke by said beam.

21. The combination of claim 20 in which means is provided to oppose movement of said ram in one direction.

22. In a press actuator, a supporting structure, a rotatable crank arm carried by said structure and adapted for continuous rotation, a ram mounted for reciprocal movement in said structure, a yoke mounted for reciprocal movement in said structure, a beam means pivotally mounting said beam on said ram, a first link connecting one portion of said beam to said arm, a link member pivotally mounted on said yoke, a second link pivotally connected to a second portion of said beam and to said link member, means normally biasing said link member to a position in which said link member is operable to rock to permit cyclic movement of said beam about said ram pivotal connection, and means to overcome said bias whereby said link member is moved to a second position in which it is held against rocking to cause said beam to rock about said beam connecting with said second link.

23. The combination of claim 22 in which force exerting means is provided to hold said yoke against movement at applied force magnitudes below a predetermined force and to permit said yoke to move at applied forces above said predetermined force.

24. The combination of claim 23 in which means is provided to render said force exerting means ineffective.

JAY W. COOK.

REFERENCES CITED

The following references are of record in the file of this patent:

UNITED STATES PATENTS

| Number | Name | Date |
| --- | --- | --- |
| 1,327,272 | Dellgren | Jan. 6, 1920 |
| 1,956,923 | Jendrassick | May 1, 1934 |
| 2,386,706 | Moessinger | Oct. 9, 1945 |
| 2,468,002 | Teal | Apr. 19, 1949 |